United States Patent [19]
Whitaker

[11] 4,394,003
[45] Jul. 19, 1983

[54] CRYOGENIC BUTTERFLY VALVE WITH BI-DIRECTIONAL SEALING CAPABILITY

[75] Inventor: Ritchie W. Whitaker, El Toro, Calif.
[73] Assignee: The Walworth Company, Valley Forge, Del.
[21] Appl. No.: 321,591
[22] Filed: Nov. 16, 1981
[51] Int. Cl.³ .............................................. F16K 25/00
[52] U.S. Cl. .................................... 251/173; 251/306
[58] Field of Search ................................ 251/173, 306

[56] References Cited
U.S. PATENT DOCUMENTS

| | | | |
|---|---|---|---|
| 3,077,331 | 2/1963 | Burtis | 251/173 |
| 3,650,508 | 3/1972 | Kosmala | 251/173 X |
| 3,734,457 | 5/1973 | Roos | 251/173 |
| 4,005,848 | 2/1975 | Eggleston | 251/173 |

Primary Examiner—Harold W. Weakley
Attorney, Agent, or Firm—Melvin R. Stidham

[57] ABSTRACT

A valve seal for a cryogenic butterfly valve comprising a reclining U-shaped resilient seal with the annular edge of the longer radially outer leg being gripped in the valve body to form a static seal. Pressure in one direction acts around the outer surface of the seal to pivot it about the static seal against the valve disc. Pressure in the other direction acts between the legs of the seal ring and, because the seal is restrained by the valve body against pivoting away from the valve disc, the pressure separates the legs to bias the radially inner leg inwardly against the valve disc.

8 Claims, 5 Drawing Figures

CRYOGENIC BUTTERFLY VALVE WITH BI-DIRECTIONAL SEALING CAPABILITY

BACKGROUND OF THE INVENTION

With the increasingly widespread handling of cryogenic fluids, there is a continuing need for valves which have a sealing capability over a wide range of temperatures, particularly at cryogenic temperatures wherein normally resilient sealing materials become quite hard and are difficult to flex into sealing engagement. It is further desirable to have a valve which is capable of providing a fluid-tight seal irrespective of the direction of pipeline pressure.

OBJECTS OF THE INVENTION

It is an object of this invention to provide a resilient valve seal which is capable of sealing effectively, irrespective of the direction of pipeline pressure.

It is a further object of this invention to provide a valve sealing device which is effective over a broad range of temperatures.

It is a further object of this invention to provide a valve sealing device which provides an effctive seal at both low and high pressure conditions.

Other objects and advantages of this invention will become apparent from the description to follow, particularly when read in conjunction with the accompanying drawings.

SUMMARY OF THE INVENTION

In carrying out this invention, I provide a butterfly valve wherein the annular sealing surface on the disc is carried around the outer periphery thereof. A surrounding valve sealing device has a resilient cantilever type seal ring of reclining-U cross-section.

The radially outer leg of the seal is longer than the inner leg, is gripped around its edge to provide a static seal, with the remainder of the seal being free to pivot about the static seal in cantilever fashion. The shorter, inner leg has a radially inward extension which engages the valve disc to form a dynamic seal therewith, and a resilient perforate ring is carried in the seal cavity between the upper and lower legs to transmit forces between them mechanically. A restraining ring backs up the resilient seal ring to prevent it from pivoting outward away from the valve disc. Pressure in one direction around the outside of the seal tends to pivot the seal radially inward into sealing engagement, with the rotational force being transmitted from the upper leg, through the force transmitting ring to the lower leg. Pressure in the other direction enters the valve cavity and, because the upper leg is restrained against outward movement, tends to separate the legs to bring the inner leg, and the inward sealing extension, into sealing engagement with the valve disc.

DESCRIPTION OF A PREFERRED EMBODIMENT

Figure 1:
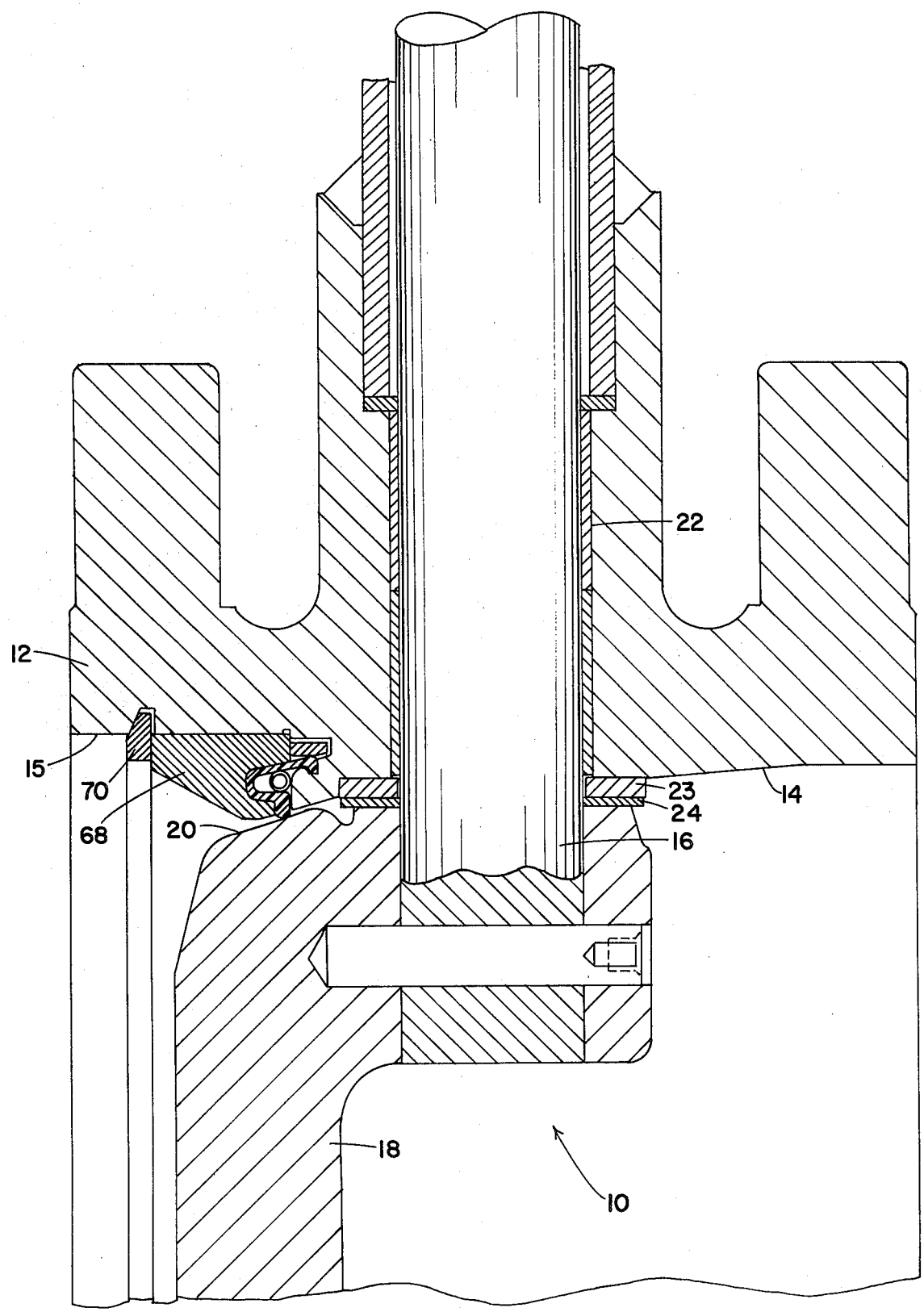
FIG. 1 is a partial section view of a butterfly valve embodying features of this invention.

Referring now to FIG. 1 with greater particularity, the butterfly valve 10 embodying features of this invention includes a generally cylindrical valve body 12 having upstream and downstream flow passages 14 and 15 therethrough. Rotatably carried in the valve body as by mounting on a stem 16 is a valve disc 18 having an outer sealing surface 20 around the periphery thereof.

Figure 4:
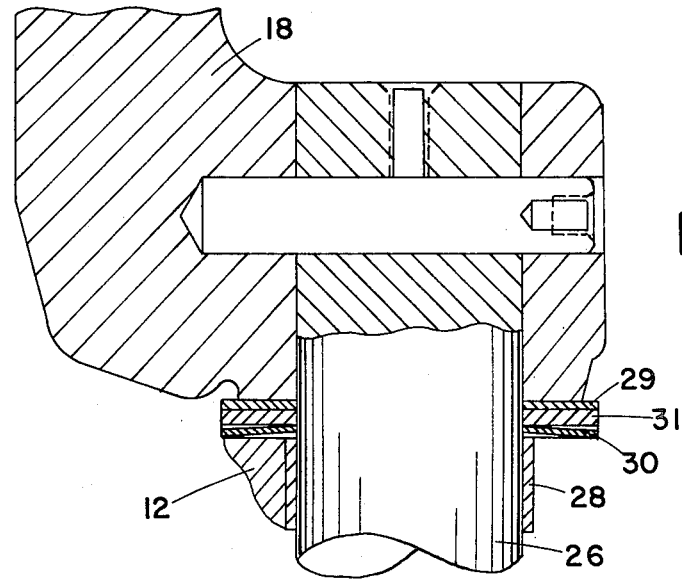
FIG. 4 is an enlarged partial section view of the lower bearing mounting of the butterfly valve.

The stem 16 is rotatably carried in bushings 22, with a spacer 23 to hold the disc 18 against the thrust washer 24, on the valve body 12, and a lower idler stem 26 (FIG. 4) is carried in a lower bearing 28 with thrust washer 29. A Belleville spring 30 is interposed between the valve body and a spacer 31, to maintain the valve disc 18 centered in valve body 12 despite pressure variations. This is a significant feature in that the disc tends to settle at low pressure differential, e.g. an open position, to cause the seal ring to yield. This could create a leak path on closing, if the indentation is not fully restored.

Figure 2:
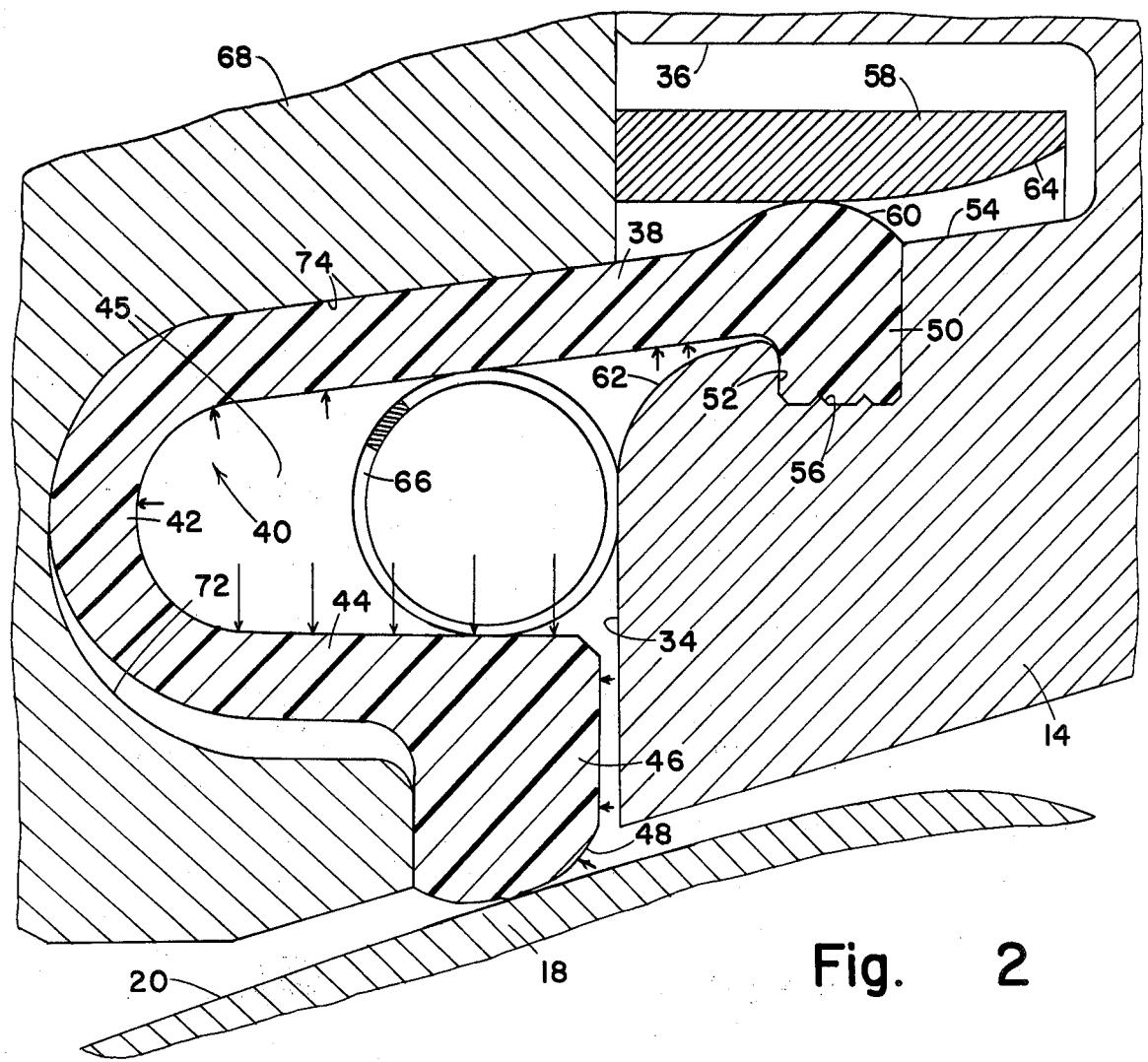
FIGS. 2 and 3 are enlarged partial section views of the sealing means of the valve of FIG. 1.
Figure 3:
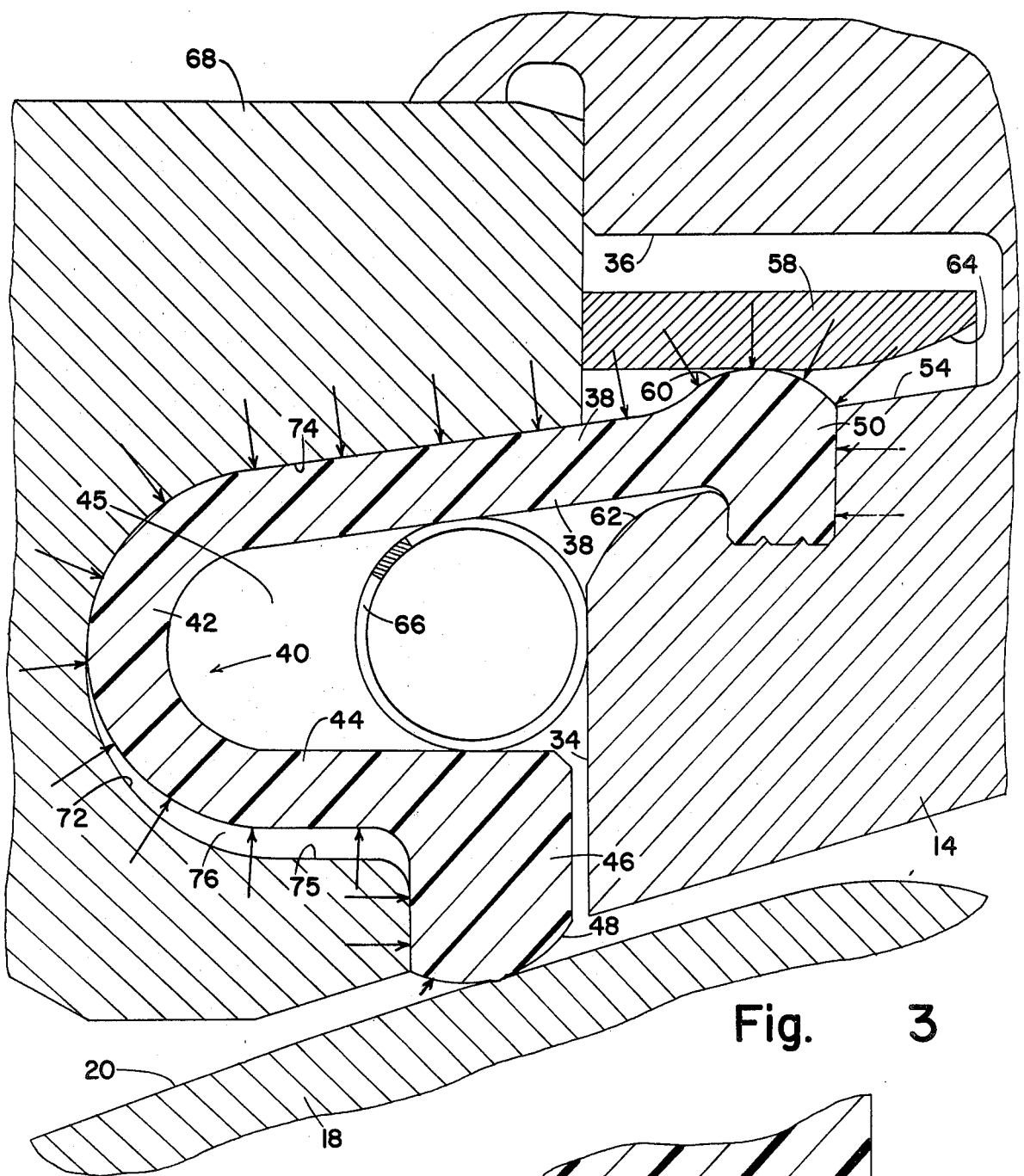

Referring now to FIGS. 2 and 3, the valve body 14 includes a radial wall 34 in which is cut an annular lateral groove 36. Received in the groove 36 is the radially outer leg 38 of a reclining U-shaped resilient seal ring 40 having an arcuate bight 42 and a radially inner leg 44 on which is carried a radially inward dynamic seal extension 46 having an arcuate, convex annular sealing surface 48.

Extending inward from the end of the outer leg 38 is a static seal extension or lip 50 which is received in an annular groove 52 cut into the lower wall 54 of the lateral groove 36 previously mentioned. Since the static seal 50 is disposed radially, it shrinks to seal more firmly on the body 14 at low temperatures. The bottom surface of the groove 52 may be provided with relatively sharp ridges 56 to provide a mechanical interlock with the static seal lip 50, and the static seal rim or lip 50 is urged into place by means of a hoop ring 58 which forms an interference fit with the back surface 60 of the static seal 50. The lateral groove 36 may have its lower wall 54 cut away at 62 to facilitate insertion of the resilient seal 40, and enable pivotal movement of the seal ring 40 about the gripped rim 50. The leading under-surface 64 of the loop ring 58 may be curved as shown to facilitate insertion of it over the static seal 50.

Carried between the radially outer and inner legs 38 and 44 of the resilient seal 40 is a coiled garter ring 66 which functions to provide a mechanical preload on the dynamic seal 46, and to transmit forces mechanically from the outer leg 38 of the seal ring 40 to the inner leg 44 without entrapping fluid between them.

A retainer ring 68 is inserted into the valve body passage 15 (FIG. 1) and retained in place as by means of a split keeper ring 70. The retainer ring has a curved recess 72 which receives the legs 38, 44 and bight 42 of the resilient seal ring 40. The upper wall 74 of the recess is disposed at a slight angle to facilitate assembly and, to wedge the garter ring 66 in place. Further, it directs the load of downstream pressure, which is imposed on the dynamic seal 46, at a slight angle to the vertical in FIG. 3, i.e. displaced toward the right and, therefore, is more sensitive to downstream pressure. Also, the wall 74 engages the outer surface of the upper outer leg 38 to prevent rotation of the seal in a clockwise direction, as viewed in FIGS. 2 and 3.

Referring more closely to FIG. 2 the operation of the seal ring will be described in connection with the usual direction of pipeline flow or pressure differential, i.e. from right to left. With the pressure in that direction, the fluid enters the cavity 45 between the upper and lower legs 38 and 44 of the valve seal and, since the top wall 74 of the retainer ring recess 72 prevents rotation of the resilient seal in a clockwise direction, the upper and lower legs 38 and 44 will simply spread apart to force the convex sealing surface 48 firmly into engagement with the working surface 20 on the valve disc 18. Further, pressure in this direction tends to force the valve disc 18 towards the left. This increases the force against seal 46 to increase the preload imposed by the garter ring 66.

Now, referring to FIG. 3, with the pressure differential in the opposite direction the pressure will enter into the recess 72 to act against the outer surface of the resilient seal 40. Since the longer, radially outer leg 38 of the seal is of greater area, than the shorter inner leg 44, the result is a differential in total force, pivoting the seal ring 40 about the gripped static seal fulcrum 50, in a counterclockwise direction tending to close the normal clearance 76 between the outer surface of the inner leg 44 and the lower wall 75 of the retainer ring recess 72. This force is transmitted through the garter ring 66 to the lower leg 44 bringing the convex, dynamic sealing surface 48 into firm engagement with the working surface 20 on the valve disc 18. While forces in this direction tend to force the valve disc toward the right, to reduce the load on the resilient seal 46, the elasticity of the garter spring 66 is set to maintain a minimum force.

Figure 5:
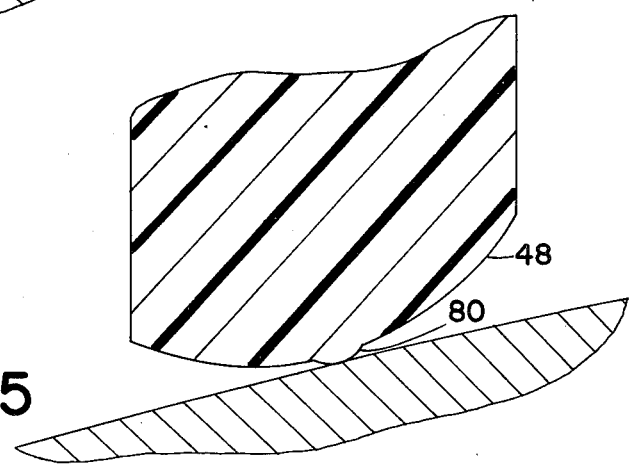
FIG. 5 is an enlarged partial view of the dynamic seal.

In absence of pressure in either direction, the garter ring 66 separates the outer and inner legs 38 and 44 to bring the concave sealing surface 48 toward the valve disc 20. To facilitate firm sealings on such light loads, a small convex ridge 80 (FIG. 5) is formed around the convex sealing surface 48 to provide a narrow, line sealing surface which concentrates forces for a more effective seal.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. In a valve comprising:
a valve body having a flow passage therethrough;
a valve disc rotatably mounted in said body between valve open and valve closed positions;
an annular sealing surface around the periphery of said valve disc; and
an annular sealing device on said body surrounding said sealing surface;
said sealing device comprising:
an annular relatively wide recess having a relatively narrow opening therefrom;
a resilient seal ring in said recess;
said seal ring being of generally reclining-U configuration, with legs transverse to the axis of rotation of said disc;
the radially outer leg being longer than the inner leg so that pressure acting against the outer surface of said seal ring will bias same radially inward;
means clamping and sealing the annular edge of said outer leg in said body; and
a radially extending, dynamic seal inward extension on the end of said inner leg extending through said narrow opening into sealing engagement with said disc.

2. The sealing device defined by claim 1 including:
a non-sealing, force-transmitting ring carried in said seal ring between said radially inner and outer legs so that radial forces on the outer surface of said outer leg will be transmitted to said inner leg to force said dynamic seal radially inward.

3. The sealing device defined by claim 1 including:
a rigid restraining surface on said valve body surrounding said resilient seal and disposed so that, with the radially outer leg in engagement therewith in absence of pressure, said dynamic seal extension is in engagement with said valve disc, whereby pressure asking on the interior surface of said resilient seal ring forces the inner leg thereof radially inward into firm sealing engagement with said valve disc.

4. The sealing device defined by claim 1 including:
a static seal groove around said valve body adjacent said recess;
a static seal rim on the outer leg of said resilient seal extending radially inward into said groove; and
a hoop ring around the end of said outer leg retaining said static seal rim in said groove.

5. The sealing device defined by claim 4 including:
a plurality of relatively sharp ridges around said static seal groove to interlock with said resilient static seal rim.

6. The sealing device defined by claim 1 wherein:
said dynamic seal extension has a curved, convex radially inner surface engaging said valve disc.

7. The sealing device defined by claim 6 including:
a narrow curved ridge around said convex inner surface to provide a narrow contact ring with said valve disc at low loads.

8. The sealing device defined by claim 4 wherein said seal ring recess comprises:
a radial wall in said valve body;
an annular groove around said wall with upper and lower, generally cylindrical walls;
said static seal groove being formed in said lower, generally cylindrical wall, and the end of said outer leg and said hoop ring being received in said annular groove;
a retainer ring received in said body to abut said radial wall; and
an opposing curved recess in said retainer rim receiving the bight and legs of said resilient seal.

* * * * *